Figure 1:
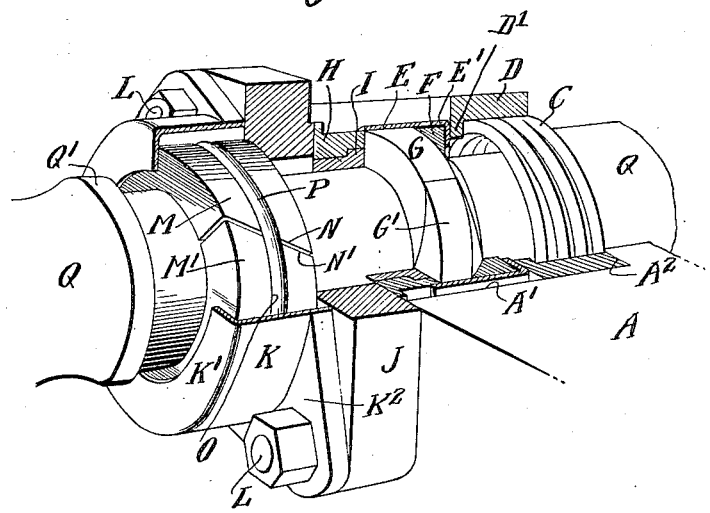

June 26, 1923.

J. W. PRICE, JR 1,460,174

PISTON ROD SWAB

Filed Jan. 12, 1921

Inventor
Joseph W. Price, Jr.,
By his Attorney
Francis K Chambers

Patented June 26, 1923.

1,460,174

UNITED STATES PATENT OFFICE.

JOSEPH W. PRICE, JR., OF PHILADELPHIA, PENNSYLVANIA, ASSIGNOR TO THE UNITED STATES METALLIC PACKING COMPANY, OF PHILADELPHIA, PENNSYLVANIA, A CORPORATION OF PENNSYLVANIA.

PISTON-ROD SWAB.

Application filed January 12, 1921. Serial No. 436,647.

*To all whom it may concern:*

Be it known that I, JOSEPH W. PRICE, Jr., a citizen of the United States of America, residing in the city and county of Philadelphia, in the State of Pennsylvania, have invented certain new and useful Improvements in Piston-Rod Swabs, of which the following is a true and exact description, reference being had to the accompanying drawings, which form a part thereof.

My invention relates to swabs such as are used in connection with piston rods. Heretofore such swabs have been made of fibrous material kept more or less soaked with oil and in use they collect and incorporate dirt and grit and tend to become hard unyielding and not good conveyors of oil. They are, therefore, defective as a means for lubricating the rods and the grit collected by them is a not inconsiderable cause of the wearing of the rod. In experimenting to find means to obviate the defects of the swabs as heretofore constructed I have discovered that oil soaked wood, such as is used for bushings, if formed into a segmental ring the segments of which overlap each other when assembled on a rod, will, when such rings are used as swabs, afford a sufficient and constant supply of lubricant to the rod and will at the same time scrape off the dust and grit adhering to the rod without incorporating the grit in the wood and my invention consists in a swab ring so made up and constructed.

In the drawing I have illustrated my new swab ring in what I believe to be its best construction and mode of application.

Figure 2:
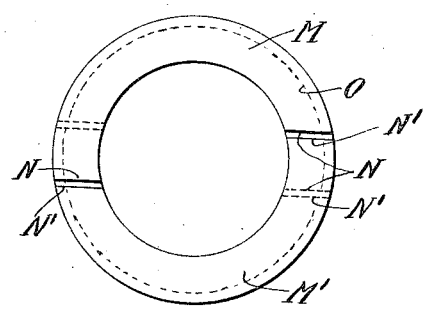

Figure 1 being a perspective view, partly in section showing a metallic packing provided with my new swab ring, and Figure 2 is an end view of the swab ring.

A indicates the head of a locomotive cylinder having formed in it the cylindrical packing chamber A' with an inner shoulder A². C is a spring abutting against shoulder A² and against the annular shoulder D' of a follower D. E is a cylindrical casing having an inwardly extending annular shoulder E' against which the follower D abuts. F is a ring having an outer end as shown, its inner end abutting against shoulder E' of casing E and its conical end abutting against the conical end of the metallic packing ring segments indicated at G, G'. The ring segments abut against the rings I and H which are held in place by the gland plate J. K, K', is a swab casing having lugs K² by which it is clamped against the gland plate by the nuts screwing on the rods L. Q is the piston rod having as shown, an enlargement Q'.

In all the above features the construction shown is of a usual and well known character. M and M' are ring segments cut out of oil soaked wood and having their ends cut, as shown, at N, N, and N', N', so as to overlap each other when assembled on a piston rod as shown, and the cuts are so made as to leave a space between the segments so that as they wear by the friction of the rod the segments can move towards each other and maintain contact with the rod. O is a groove formed on the outside of the segments, to form a seat for a spring P which presses them against the rod.

The assembly and mode of use of my new swab ring is obvious from the drawing. The segments are placed in ring form on the rod, secured in place by the spring P and enclosed in the casing K, K'. The lapping ends of the segments maintain a contact of oil soaked wood with all parts of the piston rod and insure the scraping off from the rod of dirt and grit so that only a clean and oiled rod comes in contact with the metallic packing G G', and the rod and packing are both protected against wear due to grit.

The special cutting of the swab ring segments to secure an overlapping of their ends, as shown, is simple and efficient but may of course be modified in any way which will cause an overlap.

In referring to the wood I use in making my swab rings as "oil soaked" I mean treated with lubricants such as are used with wood employed for bearings or bushings: waxes, paraffines and stearines are types of such generally used lubricants. Lighter lubricating oils are not so well adapted to my use on account of the high temperature to which the swab rings are exposed.

Having now described my invention, what I claim as new and desire to secure by Letters Patent, is:

1. A swab for use with piston rods and metallic packings therefor consisting of a segmental ring made up of segments of wood soaked in oil and having ends shaped to overlap each other when said ring segments are assembled on a piston rod.

2. In combination with a stuffing box for steam engine piston rods said box comprising metallic packing rings and a gland for holding them in position on the rod, a swab case on the outside of the gland and a swab contained in said case consisting of a segmental ring the segments of which are of oil soaked wood and shaped to overlap each other at their ends when said segments are assembled in said case and upon the piston rod.

JOSEPH W. PRICE, JR.